(12) United States Patent
O'Reilly et al.

(10) Patent No.: US 10,665,996 B2
(45) Date of Patent: May 26, 2020

(54) RECHARGEABLE USB ELECTRICAL OUTLET WITH INTEGRATED LIGHTING

(71) Applicant: O'Reilly Winship, LLC, Dallas, TX (US)

(72) Inventors: Michael O'Reilly, Dallas, TX (US); Donnye Winship, Dallas, TX (US)

(73) Assignee: O'Reilly Winship, LLC, Dallas, TX (US)

( * ) Notice: Subject to any disclaimer, the term of this patent is extended or adjusted under 35 U.S.C. 154(b) by 0 days.

(21) Appl. No.: 16/138,364

(22) Filed: Sep. 21, 2018

(65) Prior Publication Data

US 2019/0089104 A1 Mar. 21, 2019

Related U.S. Application Data

(63) Continuation-in-part of application No. 15/984,005, filed on May 18, 2018.
(Continued)

(51) Int. Cl.
*H01R 13/46* (2006.01)
*H01R 13/717* (2006.01)
(Continued)

(52) U.S. Cl.
CPC .......... *H01R 13/7175* (2013.01); *F21S 8/035* (2013.01); *F21S 9/022* (2013.01);
(Continued)

(58) Field of Classification Search
CPC ............ H02G 3/14; H02G 3/18; H02G 3/081; H05K 5/00; H01R 13/7175; H01R 27/02; H01R 13/665; H01R 25/006; H01R 13/04; H01R 13/701; H01R 13/713; H01R 31/065; H01R 24/68; H01R 13/46; H05B 33/0854; H05B 33/0842; H01H 9/0264;
(Continued)

(56) References Cited

U.S. PATENT DOCUMENTS 3,739,226 A 6/1973 Seiter et al.
4,514,789 A 4/1985 Jester
(Continued)

OTHER PUBLICATIONS

Capstone Industries, Inc., Capstone 2 in 1 LED Night Light Power Failure Wall Plate, website and product.

*Primary Examiner* — Angel R Estrada
(74) *Attorney, Agent, or Firm* — David W. Carstens; J. Andrew Reed; Carstens & Cahoon, LLP

(57) ABSTRACT

An electrical outlet device and system for providing light and power during the night or during a power failure. The device and system includes rechargeable energy storage devices that can be utilized to provide power to the outlet(s) and the light sources. The device and system can have two sections, a main and a removable section both having their own energy storage devices and light sources. The light sources can be controlled by a control circuit that can utilize one or more switches or sensors to control the activation or deactivation of the light sources and also the transfer of energy from the energy storage devices to the light sources or outlets of the main section. The main section can also have USB and electrical outlets or plugs to allow the device and system to be plugged into an AC or DC power source, and can transfer that energy to the USB and electrical outlets or plugs.

19 Claims, 3 Drawing Sheets

Related U.S. Application Data

(60) Provisional application No. 62/561,308, filed on Sep. 21, 2017, provisional application No. 62/673,630, filed on May 18, 2018.

(51) Int. Cl.

| | |
|---|---|
| *H02J 7/00* | (2006.01) |
| *H01R 13/70* | (2006.01) |
| *H01R 13/713* | (2006.01) |
| *F21S 9/02* | (2006.01) |
| *H01R 31/06* | (2006.01) |
| *F21S 8/00* | (2006.01) |
| *H05B 45/00* | (2020.01) |
| *H02J 7/34* | (2006.01) |
| *H01R 27/02* | (2006.01) |
| *H01R 24/68* | (2011.01) |
| *F21Y 115/10* | (2016.01) |

(52) U.S. Cl.
CPC ......... *H01R 13/701* (2013.01); *H01R 13/713* (2013.01); *H01R 31/065* (2013.01); *H02J 7/0042* (2013.01); *H02J 7/0045* (2013.01); *H02J 7/0068* (2013.01); *H05B 45/00* (2020.01); *F21Y 2115/10* (2016.08); *H01R 24/68* (2013.01); *H01R 27/02* (2013.01); *H02J 7/345* (2013.01)

(58) Field of Classification Search
CPC ...... H01H 21/04; H01H 9/0271; H01H 13/04; H02B 1/46; H02J 7/345; H02J 7/0042; H02J 7/0068; F21V 33/00; F21S 9/022; F21S 8/035; F21Y 2115/10
USPC ........... 174/66, 67, 480, 481, 53, 57, 59, 50; 220/241, 242, 3.2, 3.3, 4.02; 439/16, 439/143; 362/95
See application file for complete search history.

(56) References Cited

U.S. PATENT DOCUMENTS

| | | | |
|---|---|---|---|
| 5,610,802 A * | 3/1997 | Eidler | H02B 7/00 174/50 |
| 6,000,807 A | 12/1999 | Moreland | |
| 6,051,787 A | 4/2000 | Rintz | |
| 6,087,588 A | 7/2000 | Soules | |
| 6,200,159 B1 * | 3/2001 | Chou | H01R 13/6658 174/494 |
| 6,297,450 B1 * | 10/2001 | Yu | H02G 3/14 174/480 |
| 6,423,900 B1 | 7/2002 | Soules | |
| 6,897,379 B1 * | 5/2005 | Hsiao | H01H 9/0214 174/480 |
| 7,442,090 B2 * | 10/2008 | Mori | H01R 25/003 174/53 |
| 7,581,844 B1 | 9/2009 | Yang | |
| 8,119,910 B1 * | 2/2012 | Golden | H02G 3/185 174/53 |
| 8,149,570 B2 * | 4/2012 | Keebler | H02J 7/0055 307/11 |
| 8,158,883 B2 * | 4/2012 | Soffer | H04B 3/56 174/480 |
| 8,912,442 B2 | 12/2014 | Smith | |
| 9,035,180 B2 | 5/2015 | Smith et al. | |
| 9,035,181 B2 | 5/2015 | Smith et al. | |
| 9,362,728 B2 | 6/2016 | Smith et al. | |
| 9,482,426 B2 | 11/2016 | Diotte | |
| D781,241 S | 3/2017 | Knight | |
| 9,635,773 B1 * | 4/2017 | Marshall | H01R 13/70 |
| 9,742,111 B2 | 8/2017 | Smith et al. | |
| 9,744,374 B1 | 9/2017 | St. Laurent et al. | |
| 9,768,562 B2 | 9/2017 | Smith et al. | |
| 9,774,154 B2 | 9/2017 | St. Laurent et al. | |
| 9,787,025 B2 | 10/2017 | Smith et al. | |
| 9,807,829 B2 | 10/2017 | Jensen | |
| 9,832,841 B2 | 11/2017 | Knight et al. | |
| 9,871,324 B2 | 1/2018 | Smith et al. | |
| 9,882,318 B2 | 1/2018 | Smith et al. | |
| 9,882,361 B2 | 1/2018 | Smith et al. | |
| D809,899 S | 2/2018 | Knight et al. | |
| D810,697 S | 2/2018 | Smith | |
| 9,899,814 B2 | 2/2018 | Smith et al. | |
| 9,917,430 B2 | 3/2018 | Smith et al. | |
| D819,426 S | 6/2018 | Smith et al. | |
| D832,223 S | 10/2018 | Knight | |
| D832,224 S | 10/2018 | Knight et al. | |
| 10,109,945 B2 | 10/2018 | Smith et al. | |
| 2004/0142601 A1 | 7/2004 | Luu | |
| 2018/0048099 A1 | 2/2018 | Diotte | |
| 2019/0020156 A1 | 1/2019 | Smith et al. | |

* cited by examiner

RECHARGEABLE USB ELECTRICAL OUTLET WITH INTEGRATED LIGHTING

CROSS-REFERENCE TO RELATED APPLICATIONS

This application is a continuation-in-part application of U.S. Non-Provisional application Ser. No. 15/984,005, filed May 18, 2018, which claims the benefit of U.S. Provisional Application No. 62/561,308, filed Sep. 21, 2017, the disclosure of which is incorporated herein by reference.

This application claims the benefit and priority to U.S. Provisional Application No. 62/673,630 filed May 18, 2018, the disclosure of which is incorporated herein by reference.

TECHNICAL FIELD

The present disclosure relates to a light emitting electrical outlet. More particularly, and not by way of limitation, the present disclosure is directed to a system and apparatus for a light emitting electrical outlet with a removable light source and USB outlets.

BACKGROUND

Electrical outlets are a necessary part of everyday life for a majority of people throughout the world. However, there are two major drawbacks with traditional electrical outlets. First, they do not operate without a power source, and second, they are often placed in locations that are either not lighted well or completely devoid of any light source requiring lamps or flashlights in order to plug any device into them.

Additionally, electrical outlets are often taken up by night-lights, especially in the rooms of small children. While, night-lights, and emergency lighting devices have been around for many years, each have their own individual downfalls. Night-lights in particular often require at least one electrical outlet or socket to be used, while in some cases both outlets are used by the night-light. These lights also can become very hot, and if other items in a room such as a child's blanket or stuffed animal comes in contact with the night-light for an extended period then a fire hazard, or even an actual fire can result. For emergency lighting, there is typically no manner of operation that allows the light to be utilized in anything other than in an emergency. Additionally, these lights typically use at least one if not both outlets of a traditional electrical plug outlet or socket.

One of the additional downfalls these devices is there is no manner or means for dual operation for a night-light and emergency lighting. In many cases, a night light cannot operate as an emergency light due a requirement that they be plugged into an outlet or socket that cannot provide power during a power outage. Many night-lights also do not include light detectors or photovoltaic cell to determine when daylight or other lights sources are sufficient to turn off and/or allow the night-light to cool. Conversely, emergency lights are not conducive to use as night lights because emergency lights require large batteries or other energy source that can be utilized in the event of a power failure to produce a strong or high intensity light, along with circuitry to detect when a power failure occurs. These emergency lights are also often connected together to the battery backup system for an entire building, but cannot provide lighting to pathways or in rooms that are not connected to the battery backup system.

It would be advantageous to have an apparatus, and system for an electrical outlet faceplate with integrated lighting that overcomes the disadvantages of the prior art. The present disclosure provides such an apparatus, and system.

BRIEF SUMMARY

The present disclosure is directed to a lighting device. The lighting device may be utilized throughout home, businesses, storage areas, and anywhere where electrical power can be provided. The lighting device may receive an electrical power signal from electrical power source. Thus, in one aspect, the present disclosure is directed to a lighting device incorporated within an electrical outlet or socket faceplate. The lighting device can receive electrical power from an electrical outlet via the contact points of the plug, outlet and/or switch.

In another aspect, the present disclosure is directed to a night-light device incorporated within an electrical outlet or socket. To provide a small amount of light for those such as, small children or those that have to get up during the night. In yet another aspect, the present disclosure is directed to an emergency light for use during a power failure. When a power failure occurs the lighting device may active its light source to provide light to the area and environment it has been placed.

BRIEF DESCRIPTION OF THE DRAWINGS

The novel features believed characteristic of the disclosure are set forth in the appended claims. The disclosure itself, however, as well as a preferred mode of use, further objectives and advantages thereof, will be best understood by reference to the following detailed description of illustrative embodiments when read in conjunction with the accompanying drawings, wherein:

DETAILED DESCRIPTION

Figure 1:
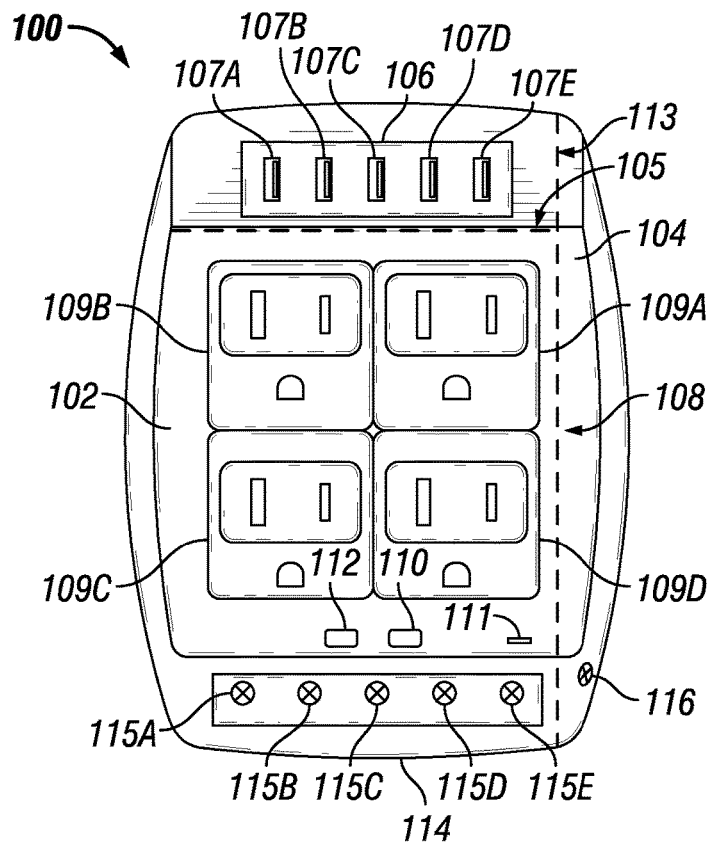
FIG. 1 is a front view illustration of an electric outlet device.

An embodiment of the disclosure will now be described. FIG. 1 is a front view illustration of an electric outlet device 100. The electric outlet device 100 is comprised of a first section 102, and a second section 104. In at least one version, the first section 102 can be a main section and the second section 104 can be a removable section. The first section 102 and the second section 104 may be coupled or fastened together through any number of fasteners and/or couplers, such as, but not limited to, screws, nails, clips, adhesives, glues, synthetic materials, dovetail, tongue and groove, post and hole, snaps or a snap like connections, or any other attachment means or method, or any combination thereof. In at least one embodiment of the present disclosure, the second section 104 can be an at least one removable sections each of the at least one removable section having their own light source (not illustrated) and energy storage device (not illustrated). In another embodiment, the first section 102 may comprise an enclosure for housing the second section 104 or a removable section of the enclosure at the coupling point 113.

The first section 102 can also include a front surface upon which, a USB outlet section 106, a plug section 108, a sensor 110, an indicator 112, and/or a light source 114 may be housed within, affixed to, or upon. The USB outlet section 106 may in at least one embodiment be removably coupled at the coupling point 105 the first section 102 with a power source (not illustrated) that can be removably coupled to the first section and/or a first section power source (not illustrated).

The USB outlet section 106 is comprised of at least one USB outlet 107A/107B/107C/107D/107E (collectively 107). The at least one USB outlet 107 can be coupled to at least one power source (not illustrated) such as, but not limited to, an AC or DC voltage. The USB outlet section 106 can have at least one of the USB outlet(s) 107 coupled to an internal power source, and/or an external power source (not illustrated). In at least one embodiment, the internal power source can be coupled to the external power source for charging.

The plug section 108 is comprised of at least one electrical plug 109A/109B/109C/109D (collectively 109). The at least one electrical plug 109 allows for an electrical device (not illustrated) to be plugged into or together with the electric outlet device 100 and receive power and/or energy. In at least one version, the at least one electrical plug 109 is a female electrical plug.

The sensor 110 is a photocell that can include, but is not limited to a photo resistor, a phototransistor, and/or a photodiode for detecting and/or measuring the amount of light, ambient light, or other environmental conditions in a local environment. In at least one embodiment, the sensor 110 may also include at least one sensor or other environmental sensors such as, but not limited to, humidity, temperature, air quality, carbon dioxide, carbon monoxide, nitrogen dioxide, vibration, accelerometer, microphones, sound detection, gas sensors, pressure sensors, tilt sensors, weather, and/or other sensors that may include or provide a signal, control signal, or indication of an environmental event or environmental condition. The sensor 110 can allow the circuitry of the electric outlet device 100 to respond to environmental conditions that can trigger changes in the behavior of the electric outlet device 100. The circuitry (not illustrated) may couple and/or decouple internal power sources from external power sources (not illustrated) based on the sensor(s) 110. For example, the sensor(s) 110 may indicate that that a light level has decreased in a room causing a light emitting device to be activated and/or coupled to a battery or other internal power source.

A sound emitter 111 may also be housed within the main section 102, or have an aperture, housing, and/or void defined by the main section 102. The sound emitter 111 can be coupled to the control circuit (not illustrated) and allow for a sound to be emitted continuously or intermittently from the electric outlet device 100 for a specified amount of time, such as but not limited to, 10 seconds, 15 seconds, 30 seconds, 1 minute, 3 minutes, 5 minutes, 10 minutes, 15 minutes, and/or 30 minutes after a power failure has occurred and the power has not been restored. For example, the sensor(s) 110 can include a carbon monoxide sensor that is activated due to an increasing amount of carbon monoxide in a room can then trigger the sound emitter 111 to alert any people within the room.

The indicator 112, in at least one version, can be at least one Light Emitting Diode (LED), or other light emitting device, such as but not limited to, a light bulb, incandescent bulb, halogen bulb, and/or fluorescent bulb. In at least one embodiment, the indicator 112 may also include, a visual display such, but not limited to, a Liquid Crystal Display (LCD), LED display, or other display devices. The indicator 112 may be utilized to indicate when an external power source is providing power to the electric outlet device 100 and/or when a power outage has occurred. The light source 114 is at least one Light Emitting Diode (LED) 115A/115B/115C/115D/115E, or other light emitting device, such as but not limited to, a light bulb, incandescent bulb, halogen bulb, and/or fluorescent bulb. The light source 114 may be activated based on the sensor(s) 110 and/or other circuitry, such as, but not limited to, a power detection circuit and/or coupling detection circuit. For example, the light source 114 can be deactivated when the second section 104 is removed from the first section 102, or activated when there is no power detected by a power detection circuit.

The second section 104 can include an indicator 116, and connectors (not illustrated) that can allow a coupling detection circuit to know when the second section 104 is removed from the first section 102. The indicator 116 is at least one Light Emitting Diode (LED), or other light emitting device, such as but not limited to, a light bulb, incandescent bulb, halogen bulb, and/or fluorescent bulb. In one embodiment, the indicator 116 may also include, a visual display such, but not limited to, a Liquid Crystal Display (LCD), LED display, or other display devices.

Figure 2:
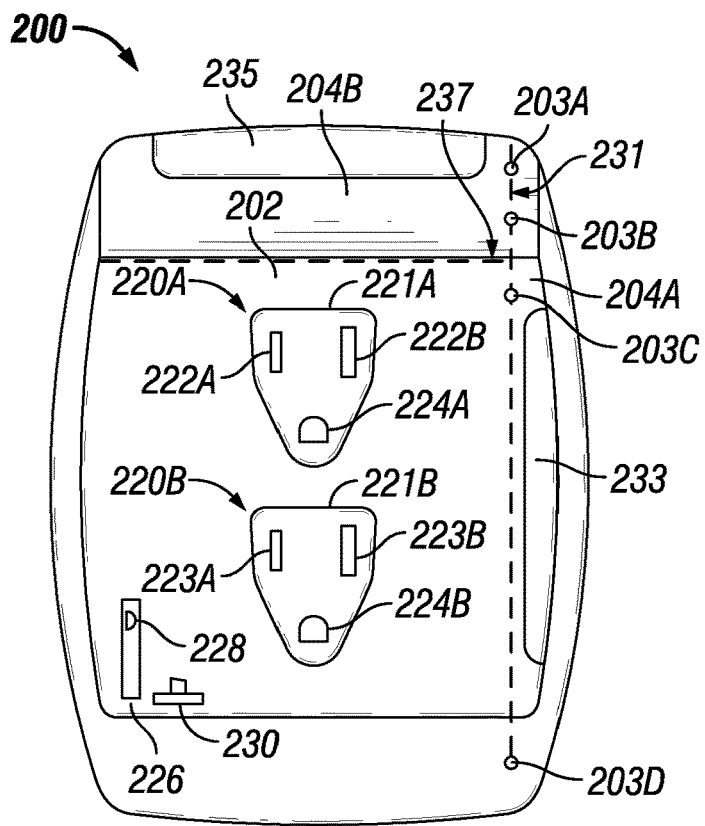
FIG. 2 is a rear view illustration of an electric outlet device.

FIG. 2 is a rear view illustration of an electric outlet device 200. The electric outlet device 200 can include a first section 202 and a second section 204. The first section 202 and the second section 204 may be coupled or fastened together through any number of fasteners and/or couplers 203A/203B/203C/203D (collectively 203), such as, but not limited to, magnets, screws, nails, clips, adhesives, glues, synthetic materials, dovetail, tongue and groove, post and hole, snaps or a snap like connection, or any other attachment means or method, or any combination thereof that may also allow for an electrical coupling.

The first section 202 may also include a first plug section 220A, a second plug section 220B, a dimming switch 226, and/or a switch 230. In at least one embodiment, the second section 204 can include a first removable section 204A and a second removable section 204B (collectively 204). The removable section(s) or second section 204, can also include a void 233 or 235 defined by removable section 204 that would allow and/or assist a user in removing the second section 204. The first removable section 204A and the second removable section 204B can be separated from the first section 202 at the respective separation points 231, and 237. The first plug section 220A can include a first plug structure 221A, a first conductor 222A, a second conductor 222B, and/or a grounding conductor 224A. The first plug structure 221A can provide an offset and/or platform for the first plug section 220A to compensate for dimming switch 226, slider 228, and/or switch 230. The first conductor 222A, the second conductor 222B, and/or the grounding conductor 224A are blade type conductors. In alternative embodiments, the first conductor 222A, the second conductor 222B, and/or the grounding conductor 224A are pole type conductors, or a combination of blade and pole type conductors. In at least one version, the first and/or second plug structure 221A/221B is a male electrical plug. In other versions, the switch 230 can be a first switch, and the dimming switch 226 can be a second switch. For example, the plug section(s) 220 can be coupled to an electric outlet to allow for a coupling to an external power source such as, but not limited to, an AC or DC power source.

The second plug section 220B can include a second plug structure 221B, a first conductor 223A, a second conductor 223B, and/or a grounding conductor 224B. The second plug structure 221B can provide an offset and/or platform for the second plug section 220B to compensate for dimming switch 226, slider 228, and/or switch 230. The first conductor 223A, the second conductor 223B, and/or the grounding conductor 224B are blade type conductors. In alternative embodiments, the first conductor 223A, the second conductor 223B, and/or the grounding conductor 224B are pole type conductors, or a combination of blade and pole type conductors.

The dimming switch 226 may include a slider 228. In alternative embodiments, the dimming switch 226 can include a rotary dial, a multi-position switch, and/or a dip (dual in-line package) switch configuration. The switch 230, in at least one version, is a dip switch. In alternative versions, the switch 230 may also be a rotary dial, a multi-position switch, and/or a slider switch configuration. For example, if a light source (not illustrated) is utilized for a night light a user may desire the light source to be dimmed from its maximum light output to say 75 percent, 50 percent, or even more preferably 25% of the maximum light output. However, when utilized in an emergency lighting scenario the maximum output would likely be utilized.

Figure 3:
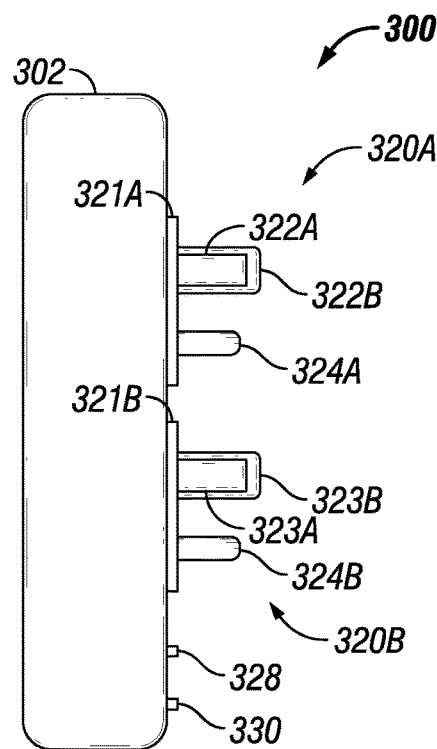
FIG. 3 is a side view illustration of an electric outlet device.

FIG. 3 is a side view illustration of an electric outlet device 300. The electric outlet device 300 can include a main section 302, and at least one a removable section (not illustrated). The main section 302 can be further comprised of a first plug section 320A, a second plug section 320B, a slider 328, and/or a switch 330.

The first plug section 320A can include a first plug structure 321A, a first conductor 322A, a second conductor 322B, and/or a grounding conductor 324A. The first plug structure 321A can provide an offset and/or platform for the first plug section 320A to compensate for the depth of the slider 328, and/or switch 330. The first conductor 322A, the second conductor 322B, and/or the grounding conductor 324A are blade type conductors. In alternative examples, the first conductor 322A, the second conductor 322B, and/or the grounding conductor 324A are pole type conductors, or a combination of blade and pole type conductors.

The second plug section 320B can include a second plug structure 321B, a first conductor 323A, a second conductor 323B, and/or a grounding conductor 324B. The second plug structure 321B can provide an offset and/or platform for the second plug section 320B to compensate for the depth of the dimming switch (not illustrated), slider 328, and/or switch 330. The first conductor 323A, the second conductor 323B, and/or the grounding conductor 324B are blade type conductors. In alternative examples, the first conductor 323A, the second conductor 323B, and/or the grounding conductor 324B are pole type conductors, or a combination of blade and pole type conductors.

The dimming switch (not illustrated) can also include a slider 328. In alternative versions, the dimming switch (not illustrated) may include a rotary dial, a multi-position switch, and/or a dip (dual in-line package) switch configuration. The switch 330, in at least one version, is a dipswitch. In alternative versions, the switch 330 may also be a rotary dial, a multi-position switch, and/or a slider switch configuration.

Figure 4:
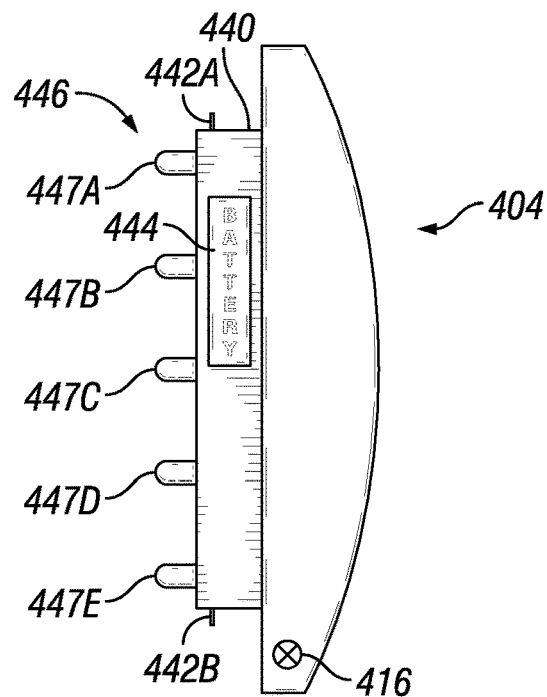
FIG. 4 is a side view illustration of a removable section of the electric outlet device.

FIG. 4 is a side view illustration of a removable section 404 of the electric outlet device (not illustrated). The removable section 404 can include an indicator 416, a storage section 440, a first connector 442A, a second connector 442B, and/or a light source 446.

The indicator 416, in at least one version, is at least one Light Emitting Diode (LED), or other light emitting device, such as but not limited to, a light bulb, incandescent bulb, halogen bulb, and/or fluorescent bulb. In one example, the indicator 416 may also include, a visual display such, but not limited to, a Liquid Crystal Display (LCD), LED display, or other display devices.

The storage section 440 can be sized to provide storage for at least one energy storage device 444. The at least one energy storage device 444 can include, but is not limited to a battery, a coin battery, a high capacity battery, a super capacitor, a fuel cell, hybrid capacitor battery or other energy storage device. In one example, the at least one energy storage device is charged when the removable section 404 of the electric outlet device is coupled and/or secured within the main section (not illustrated). The storage section 440 may also have a first connector 442A, and/or a second connector 442B that allow the at least one energy storage device 444, to be electrically coupled with a power source (not illustrated).

The at least one energy storage device 444 can be coupled to a light source 446. The light source 446 can include at least one light emitting device 447A/447B/447C/447D/447E (collectively 447). In alternative versions, each of the at least one light emitting device(s) 447 may have its own energy storage device. The at least one light emitting device can be, but is not limited to, a Light Emitting Diode (LED), or other light emitting device, such as but not limited to, a light bulb, incandescent bulb, halogen bulb, and/or fluorescent bulb.

Figure 5:
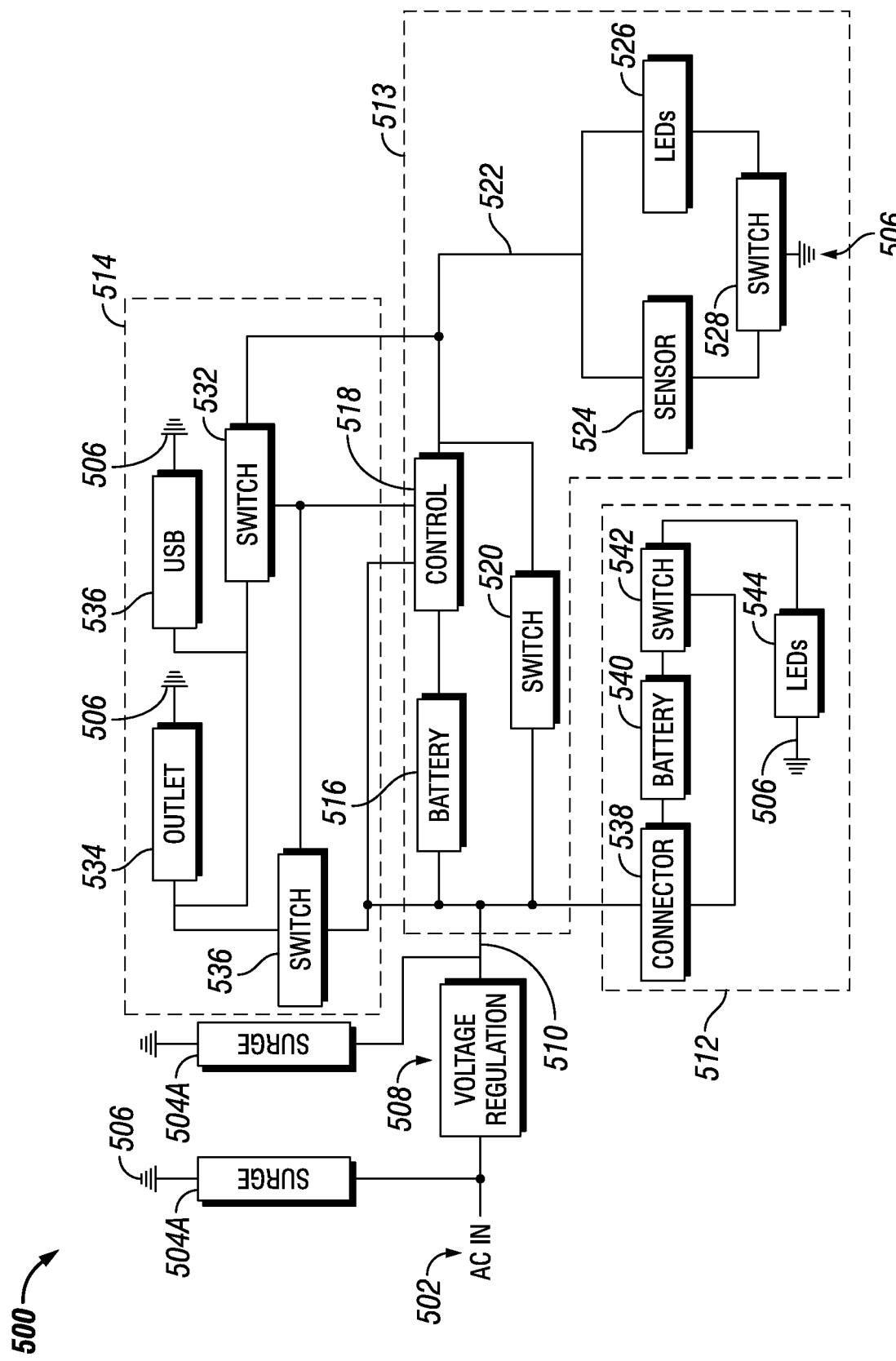
FIG. 5 is a schematic illustration of an electric outlet system.

FIG. 5 is a schematic illustration of an electric outlet system 500. The electric outlet system 500 can include a power input 502, surge protection 504 (collective of surge protector 504A, and/or surge protector 504B), voltage regulation circuit 508, a removable section 512, a plug section 514, and/or a night light and power outage section 513.

In at least one version, the power input 502 is coupled to a surge protector 504A, a voltage regulation circuit 508, and/or a surge protector 504B. The surge protectors 504A/504B can be coupled to the power source directly or indirectly, to prevent power spikes or surges that could damage other circuit elements coupled to the power input 502 and/or voltage regulation circuit 508. In one example, the surge protectors 504A/504B may also include at least one circuit breaker. The voltage regulation circuit 508 may be utilized to condition and/or convert the voltage from an AC-to-DC voltage, and/or step up or down the voltage. The output of the voltage regulation circuit 508 may be a regulated voltage 510, this regulated voltage 510 can be coupled to the removable section 512, the nightlight and power outage section 513, and/or the plug section 514.

In at least one version, the removable section 512 is coupled to the regulated voltage by a connector 538. The connector can be coupled to at least one energy storage device 540 and a switch 542. The at least one storage energy device 540 can include, but is not limited to a battery, a coin battery, or a high capacity battery. The switch 542 can be activated and/or deactivated based on the stated of the connector 538. For example, when the switch 542 is activated and/or closed then the at least one energy storage device is coupled to a light source 544. The light source 544 can include, but is not limited to, a Light Emitting Diode (LED), or other light emitting device, such as but not limited to, a light bulb, incandescent bulb, halogen bulb, and/or fluorescent bulb. The removable section 512 may also include a coupling detection circuit that can detect when the removable section 512 is removed from the first section (not illustrated). The coupling detection circuit may be activated when the connector 538 is disconnected from other circuits and/or from the first section or main body (not illustrated). When the circuit detection circuit can then activate other circuit elements, such as, but not limited to, LED(s), switches, power sources, and/or other elements or circuits.

In at least one version, the nightlight and power outage section 513 includes at least one energy storage device 516, a control circuit 518, a switch 520, a sensor 524, at least one light source 526, and/or a switch 528. The at least one energy storage device 516 can be bypassed with the switch 520 to allow the night light mode to be activated. For example, when the switch 520 is closed, then the at least one energy storage device 516 is coupled through the control circuit 518 to the sensor 524 and/or at least one light source 526. A control or bypass voltage 522 may be the output of the control circuit 518 and/or the switch 520 based on the chosen at least one operational mode of the electric outlet system 500. The control or bypass voltage 522 may be provided to the sensor 524, and/or at the least one light source 526. In at least one version, the sensor 524, is coupled to a switch 528 that can coupled the at least one light source 526 to ground 506, and/or allow the at least one light source 526 to float. The sensor 524 in one example is a photocell that can include, but is not limited to a photo resistor, a phototransistor, and/or a photodiode. In other examples, the sensor 524 may also include at least one sensor or other environmental sensors such as, but not limited to, humidity, temperature, air quality, carbon dioxide, carbon monoxide, nitrogen dioxide, vibration, accelerometer, microphones, sound detection, gas sensors, pressure sensors, tilt sensors, weather, and/or other sensors that may include or provide a signal or indication of an environmental event.

In at least one version, the plug section 514 can include a switch 530, a switch 532, at least one plug 534, and/or at least one USB outlet 536. In one example, the switches 530/532 are transistors, or other controllable circuit element capable of switching between at least two states. For example, the switches 530/532 allow for the at least one energy storage device 516 to be coupled to the at least one plug 534, and/or the at least one USB outlet 536 when the control circuit 518 indicates a power failure has occurred, and/or triggers a change of state for the switches 530/532.

In at least one version, the at least one plug 534 can be coupled to the regulated voltage alternatively it can be coupled to the power input 502 in alternative embodiments. The at least one plug 534 may include of at least one female plug. The at least one USB outlet 536 may be include of at least one female USB outlet. The at least one plug, and/or the at least one USB outlet can allow a user to couple electrical devices, such as but not limited to, lamps, computers, tablets, and/or phones (not illustrated) to the electrical outlet system 500. For example, when the at least one plug 534 is not electrically coupled to a power source (such as 502), the internal or battery power sources can be activated to provide power to the light source(s), plug(s), and/or USB outlet(s).

In at least one version, the main body can include a light source or first light source, and the removable section can include a light source or second light source. In other versions, the removable section may include a USB removable section including the USB plugs and at least one energy storage device, and/or a removable light section including a light source and at least one energy storage device. In still other versions, the light source(s) may be coupled to the control circuit to allow for a night light operational mode and/or an emergency lighting operational mode.

While the disclosure is discussed as an electric outlet device, some alternative embodiments can include outlet or switch faceplates, breaker boxes, battery backup systems, lamps, speakers, portable speakers, modems, control boxes, network access points, alarm boxes, circuit boxes, and/or other devices or systems. For example, a circuit breaker box could include a nightlight and power outage section, or power detection section that could then be utilized to activate a light source within and/or on the circuit breaker box when a power outage has occurred. A removable light source could also be include that can be removed from the circuit breaker box to allow a user to replace a bad circuit breaker and/or work on the circuit breaker box. Other examples, could include the power detection circuit and/or removable section to allow for a light source to be utilized by a user.

While this disclosure has been particularly shown and described with reference to preferred embodiments, it will be understood by those skilled in the art that various changes in form and detail may be made therein without departing from the spirit and scope of the invention. The inventors expect skilled artisans to employ such variations as appropriate, and the inventors intend the invention to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, and by way of example, although the headings refer to a "Technical Field," the claims should not be limited by the language chosen under this heading to describe the so-called field. Further, a description of a technology as background information is not to be construed as an admission that certain technology is prior art to any embodiment(s) in this disclosure. Neither is the "Brief Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

We claim:

1. An electric outlet comprising:
   (a) main body with at least one removable section and at least one electrical plug;
   (b) at least one energy storage device coupled to the at least one removable section,
   (c) first light source coupled to the main body;
   (d) second light source coupled to the at least one removable section;
   (e) sensor configured to activate the first light source through a control circuit;
   (f) first switch coupled to the control circuit to control an operational mode of the control circuit; and
   (g) at least one USB outlet with an opening defined in the main body or removable section;
      wherein the electrical outlet further comprises a second switch for controlling an output from either the first light source or the second light source.

2. The electric outlet of claim 1 further comprising at least one circuit breaker coupled to a power source.

3. The electric outlet of claim 1 wherein the at least one electrical plug is coupled to a power source.

4. The electric outlet of claim 1, wherein the at least one USB outlet is coupled to the at least one energy storage device.

5. The electric outlet of claim 1, wherein the at least one energy storage device further comprises a battery.

6. The electric outlet of claim 1, wherein the at least one energy storage device further comprises a capacitor.

7. The electric outlet of claim 1, wherein the sensor is a photo resistor.

8. The electric outlet of claim 1, wherein the sensor is a photodiode.

9. An electric outlet system comprising:
   (a) enclosure having a main body configured to electrical couple with a power source and at least one removable section;
   (b) at least one energy storage device for storing energy from the power source;
   (c) first light source for providing light from the main body;
   (d) second light source coupled to an energy storage device and providing light from the at least one removable section;
   (e) A sensor coupled to a control circuit configured to provide a control signal based on an environmental condition;
   (f) first switch coupled to the control circuit to control at least one operational mode of the control circuit; and
   (g) at least one USB outlet coupled to the energy storage device or the power source;
      wherein the electrical outlet system further comprising a second switch for controlling an output from either the first or second light source.

10. The electric outlet system of claim 9 further comprising at least one circuit breaker coupled to the power source.

11. The electric outlet system of claim 9 further comprises a male electrical plug to electrically couple with the power source.

12. The electric outlet system of claim 9 further comprises a female electrical plug electrically coupled to the control circuit.

13. The electric outlet system of claim 9, wherein the first light source is selectively coupled to the energy storage device.

14. The electric outlet system of claim 9, wherein the at least one removable section further comprises a USB removable section having an energy storage device.

15. The electric outlet system of claim 9, wherein the at least one removable section further comprises a removable light section having an energy storage device.

16. The electric outlet system of claim 9, wherein the energy storage device further comprises a battery.

17. The electric outlet system of claim 9, wherein the energy storage device further comprises a capacitor.

18. The electric outlet system of claim 9, wherein the sensor is a photodiode.

19. The electric outlet system of claim 9, wherein the sensor is a photo resistor.

* * * * *